(12) United States Patent
Kawarada

(10) Patent No.: US 11,255,384 B2
(45) Date of Patent: Feb. 22, 2022

(54) CROSS SHAFT JOINT OF VEHICLE

(71) Applicant: TOYOTA JIDOSHA KABUSHIKI KAISHA, Toyota (JP)

(72) Inventor: Kohki Kawarada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 336 days.

(21) Appl. No.: 16/360,622

(22) Filed: Mar. 21, 2019

(65) Prior Publication Data
US 2019/0293125 A1    Sep. 26, 2019

(30) Foreign Application Priority Data

Mar. 23, 2018   (JP) .............................. JP2018-057249

(51) Int. Cl.
*F16D 3/41*    (2006.01)

(52) U.S. Cl.
CPC ............ *F16D 3/41* (2013.01); *F16D 2300/06* (2013.01)

(58) Field of Classification Search
CPC .......... F16D 3/41; F16D 2300/06; F16D 3/38; F16D 3/26
USPC ......................................................... 464/14
See application file for complete search history.

(56) References Cited

FOREIGN PATENT DOCUMENTS

| JP | 2006-002845 | 1/2006 | |
|---|---|---|---|
| JP | 2011-017412 | 1/2011 | |
| SU | 889936 | * 12/1981 | ...................... 464/14 |

OTHER PUBLICATIONS

Universal Joint and Driveshaft Design Manual, AE-7, Society of Automotive Engineers, Inc., Warrendale, PA, p. 39, TJ1079.S62. (Year: 1979).*

* cited by examiner

*Primary Examiner* — Greg Binda
(74) *Attorney, Agent, or Firm* — Oblon, McClelland, Maier & Neustadt, L.L.P.

(57) ABSTRACT

A cross shaft joint of a vehicle includes: a cross shaft provided on a power transmission path; a first yoke rotatably supporting a pair of the four shaft portions; and a second yoke rotatably supporting a pair of the four shaft portions. The cross shaft includes a lubrication hole passing through the inside of each of the four shaft portions and which is in communication with a shaft end of the each of the four shaft portions. The lubrication hole is formed at a position more distant, than a corresponding one of the two axes, from a position in a corresponding one of the four shaft portions to which a torque from the drive power source is transmitted through a corresponding one of the first and second yokes.

6 Claims, 5 Drawing Sheets

CROSS SHAFT JOINT OF VEHICLE

This application claims priority from Japanese Patent Application No. 2018-057249 filed on Mar. 23, 2018, the disclosure of which is herein incorporated by reference in its entirety.

FIELD OF THE ART

The present invention relates to an improvement in durability of a cross shaft joint of a vehicle.

BACKGROUND ART

A shaft coupling that is provided on a power transmission path between a drive power source and a drive wheel and transmits power while allowing a change in an axis crossing angle of rotary shafts has been known. An example thereof is a cross shaft joint described in Patent Document 1. FIG. 5 of Patent Document 1 describes a structure in which a lubrication hole to be filled with a lubricant is formed inside a cross shaft constituting the cross shaft joint, and this lubrication hole is formed so as to incline at a predetermined angle with respect to a center of the cross shaft.

PRIOR ART DOCUMENT

Patent Document

[PATENT DOCUMENT 1] Japan Patent Publication No. 2006-2845
[PATENT DOCUMENT 2] Japan Patent Publication No. 2011-17412

SUMMARY OF THE INVENTION

Problem to be Solved by the Invention

In the cross shaft joint described in Patent Document 1, a direction of a torque input to each shaft portion of the cross shaft while running is not taken into account, therefore, depending on the position at which the lubrication hole is formed, there is a risk that durability of the cross shaft is deteriorated.

The present invention was made in view of the above-described circumstances, and an object thereof is to provide a structure suppressing deterioration in durability of a cross shaft in a cross shaft joint of a vehicle provided on a power transmission path between a drive power source and a drive wheel.

Solution to Problem

To achieve the above object, a first aspect of the present invention provides a cross shaft joint of a vehicle, comprising: (a) a cross shaft provided on a power transmission path between a drive power source and a drive wheel, and including four shaft portions formed on two axes orthogonal to each other on one plane and extending radially around an intersection between the two axes; a first yoke rotatably supporting a pair of the four shaft portions formed on one of the two axes of the cross shaft; and a second yoke rotatably supporting a pair of the four shaft portions formed on the other of the two axes of the cross shaft, wherein the cross shaft includes a lubrication hole passing through the inside of each of the four shaft portions and which is in communication with a shaft end of the each of the four shaft portions, and the lubrication hole is filled with a lubricant, wherein (b) the lubrication hole is formed at a position more distant, than a corresponding one of the two axes, from a position in a corresponding one of the four shaft portions to which a torque from the drive power source is transmitted through a corresponding one of the first and second yokes.

A second aspect of the present invention provides the cross shaft joint of a vehicle recited in the first aspect of the invention, wherein the lubrication hole is formed to incline at a predetermined angle around the intersection between the two axes with respect to the corresponding axis.

A third aspect of the present invention provides the cross shaft joint of a vehicle recited in the first aspect of the invention, wherein the lubrication hole is formed parallel to the axis, and formed at a position eccentric by a predetermined value with respect to the corresponding axis.

A fourth aspect of the present invention provides the cross shaft joint of a vehicle recited in any one of the first to third aspects of the invention, wherein the cross shaft further comprises a lubricant filling hole in communication with the lubrication hole and filled with a lubricant at the time of assembly.

Advantageous Effects of Invention

According to the cross shaft joint recited in the first aspect of the invention, the lubrication hole is formed at the position more distant, than the corresponding one of the two axes, from the position in the corresponding one of the four shaft portions to which the torque from the drive power source is transmitted through the corresponding one of the first and second yokes, therefore, a portion that is relatively decreased in rigidity by formation of the lubrication hole in the shaft portion can be moved away from the position to which the torque from the drive power source is input, and the strength of the cross shaft against the torque input from the drive power source can be increased.

According to the cross shaft joint recited in the second aspect of the invention, the lubrication hole is formed so as to incline at the predetermined angle around the intersection between the two axes with respect to the corresponding axis, therefore, the lubrication hole can be moved away from the position in the shaft portion to which the torque from the drive power source is input.

According to the cross shaft joint recited in the third aspect of the invention, the lubrication hole is parallel to the axis, and formed at the position eccentric by the predetermined value with respect to the corresponding axis, therefore, the lubrication hole can be moved away from the position in the shaft portion to which the torque from the drive power source is input.

According to the cross shaft joint recited in the fourth aspect of the invention, the cross shaft further comprises the lubricant filling hole in communication with the lubrication hole and filled with a lubricant at the time of assembly, therefore, the lubricant is filled in the lubrication hole through the lubricant filling hole at the time of assembly.

MODES FOR CARRYING OUT THE INVENTION

Hereinafter, examples of the present invention are described in detail with reference to the drawings. In the following examples, the drawings are simplified or modified as appropriate, and dimensional ratios and shapes, etc., of the respective portions are not always accurate.

EXAMPLE 1

Figure 1:
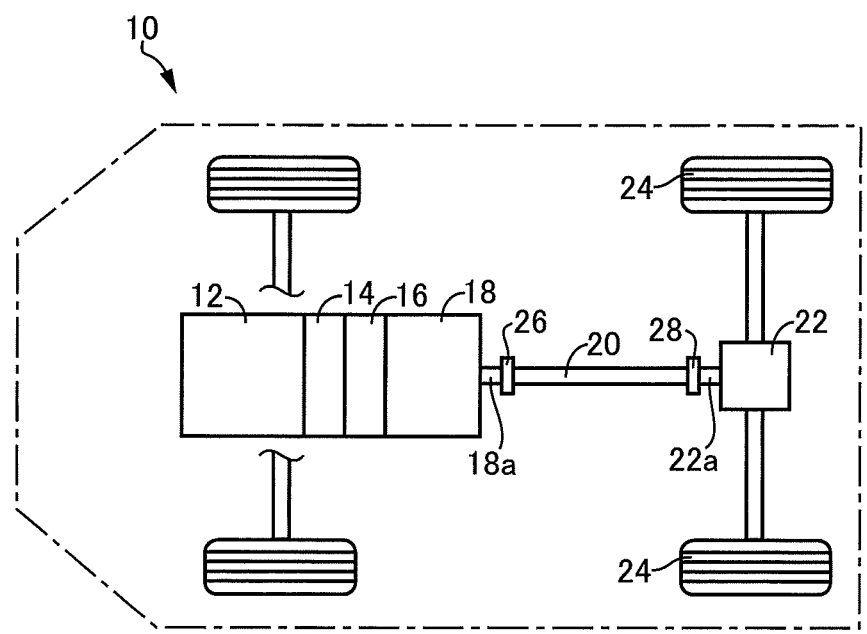
FIG. 1 is a view illustrating a schematic configuration of a hybrid vehicle to which the present invention is applied.

FIG. 1 is a view illustrating a schematic configuration of a hybrid vehicle 10 to which the present invention is applied. In FIG. 1, the hybrid vehicle 10 is an FR (front engine rear wheel drive) type vehicle and includes an engine 12 as an internal combustion engine such as a gasoline engine or a diesel engine, etc., and a motor generator 14 functioning as an electric motor and a power generator as drive power sources. Driving forces output from the engine 12 and the motor generator 14 are transmitted from a torque converter 16 as a fluid type power transmission device to an automatic transmission 18, and further transmitted to left and right drive wheels 24 via a propeller shaft 20 and a differential gear mechanism 22. The engine 12 and the motor generator 14 correspond to the drive power source of the present invention.

Figure 2:
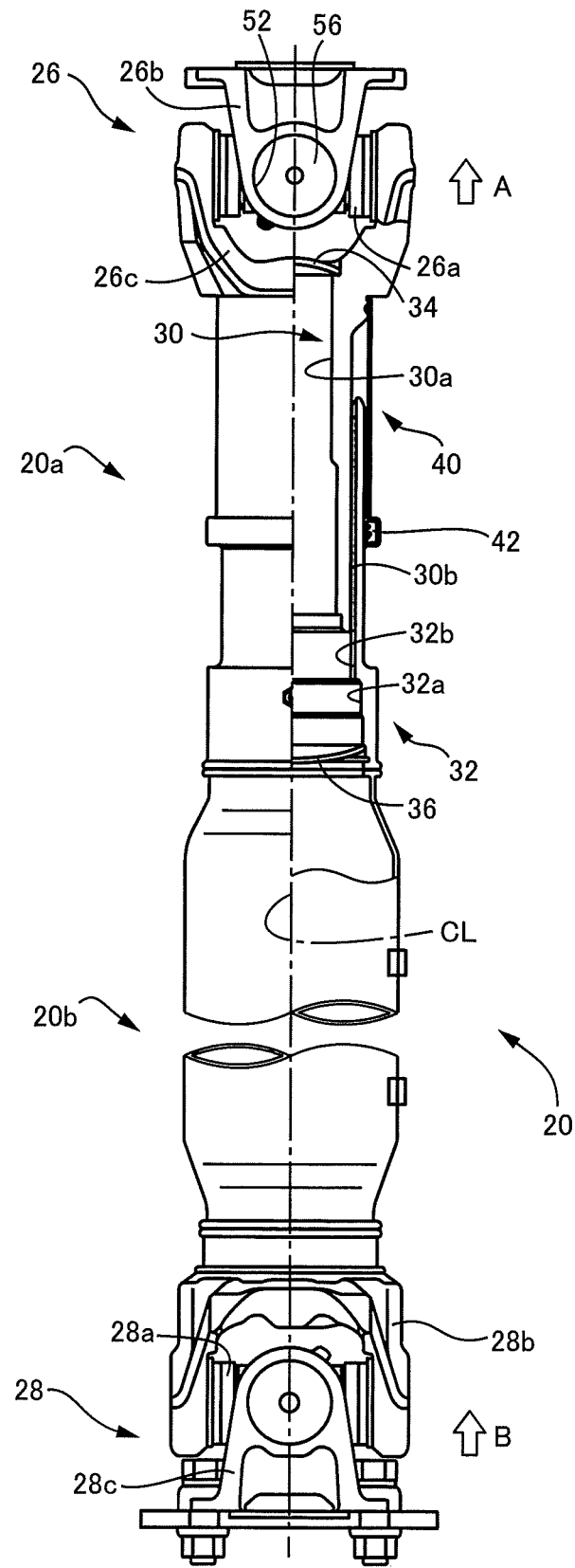
FIG. 2 is a view illustrating a configuration of a propeller shaft in FIG. 1.

FIG. 2 is a view illustrating a configuration of the propeller shaft 20 in FIG. 1. As shown in FIG. 2, the propeller shaft 20 includes a first shaft portion 20a coupled in a power transmittable manner to an output shaft 18a (refer to FIG. 1) of the automatic transmission 18 via a first cross shaft joint 26, and a second shaft portion 20b coupled in a power transmittable manner to an input shaft 22a (refer to FIG. 1) of the differential gear mechanism 22 via a second cross shaft joint 28. The first cross shaft joint 26, the propeller shaft 20, and the second cross shaft joint 28 are all provided on a power transmission path between the engine 12 and the motor generator 14 and the drive wheels 24. The first cross shaft joint 26 and the second cross shaft joint 28 correspond to the cross shaft joint of a vehicle of the present invention.

The first cross shaft joint 26 is a well-known shaft coupling (universal joint), and includes a cross shaft 26a (also referred to as a spider) formed into a cross shape, a first yoke 26b having a forked shape coupled to the output shaft 18a of the automatic transmission 18, and a second yoke 26c having a forked shape coupled to the first shaft portion 20a of the propeller shaft 20.

Also, the second cross shaft joint 28 is a well-known shaft coupling (universal joint), and includes a cross shaft 28a (also referred to as a spider) formed into a cross shape, a first yoke 28b having a forked shape coupled to the second shaft portion 20b of the propeller shaft 20, and a second yoke 28c having a forked shape coupled to the input shaft 22a of the differential gear mechanism 22.

The first shaft portion 20a of the propeller shaft 20 includes a first hollow shaft 30 which is hollow and coupled to the second yoke 26c of the first cross shaft joint 26, and a second hollow shaft 32 which is hollow and coupled to the second shaft portion 20b.

As shown in FIG. 2, the second yoke 26c of the first cross shaft joint 26 is integrally coupled to an end portion of the first hollow shaft 30 on the first cross shaft joint 26 side in an axial direction of the propeller shaft 20, and the first hollow shaft 30 is coupled in a power transmittable manner to the output shaft 18a of the automatic transmission 18 via the first cross shaft joint 26. In the first hollow shaft 30, a first shaft hole 30a is formed such that the first shaft hole 30a penetrates through the first hollow shaft 30 in an axial direction of the first hollow shaft 30, that is, the axial direction of the propeller shaft 20. Hereinafter, the axial direction means the axial direction of the propeller shaft 20 unless otherwise noted. A first lid 34 that has an arc-shaped section and closes an opening on the first cross shaft joint 26 side in the axial direction of the first hollow shaft 30 is fitted to the end portion of the first hollow shaft 30 on the first cross shaft joint 26 side in the axial direction of the first hollow shaft 30.

Also, as shown in FIG. 2, an end portion of the second hollow shaft 32 on the opposite side to the first cross shaft joint 26 side in an axial direction of the second hollow shaft 32 is integrally coupled to the second shaft portion 20b of the propeller shaft 20 by, for example, welding, etc., and the second hollow shaft 32 is coupled in a power transmittable manner to the input shaft 22a of the differential gear mechanism 22 via the second shaft portion 20b of the propeller shaft 20 and the second cross shaft joint 28, etc. In the second hollow shaft 32, as shown in FIG. 2, a second shaft hole 32a penetrating through the second hollow shaft 32 in the axial direction is formed. A second lid 36 that has an arc-shaped section and closes an opening on the opposite side to the first cross shaft joint 26 side in the axial direction of the second hollow shaft 32 is fitted to the end portion of the second hollow shaft 32 on the opposite side to the first cross shaft joint 26 side in the axial direction of the second hollow shaft 32.

As shown in FIG. 2, the first hollow shaft 30 is fitted into an inner circumferential side of the second hollow shaft 32. Accordingly, when viewed in a radial direction of the propeller shaft 20, an end portion of the first hollow shaft 30 on the opposite side to the first cross shaft joint 26 side in the axial direction of the first hollow shaft 30 overlaps an end portion of the second hollow shaft 32 on the first cross shaft joint 26 side in the axial direction of the second hollow shaft 32. On an outer circumference of the first hollow shaft 30, outer circumferential spline teeth 30b that spline-fit inner circumferential spline teeth 32b formed on an inner circumference of the second hollow shaft 32 are formed. By spline-fitting between the outer circumferential spline teeth 30b of the first hollow shaft 30 and the inner circumferential spline teeth 32b of the second hollow shaft 32, the second hollow shaft 32 becomes relatively non-rotatable with respect to the first hollow shaft 30 and relatively movable in the axial direction of the propeller shaft 20.

A cylindrical cover member 40 is fixed to the end portion of the first hollow shaft 30 on the first cross shaft joint 26 side in the axial direction of the first hollow shaft 30. An end portion of the cover member 40 on the first cross shaft joint 26 side is fixed to the end portion of the first hollow shaft 30 on the first cross shaft joint 26 side by, for example, welding, etc. Between an end portion of the cover member 40 on the opposite side to the first cross shaft joint 26 side and an outer circumferential surface of the second hollow shaft 32, an annular seal member 42 is provided.

With the propeller shaft 20 configured as described above, in a case where the drive wheels 24 move up or down according to a road surface condition, the second hollow shaft 32 moves relative to the first hollow shaft 30 in a longitudinal direction i.e. a direction toward or away from the first hollow shaft 30, and a length of the propeller shaft 20 in the axial direction changes. Accordingly, even when the drive wheels 24 move up or down according to a road surface condition while the vehicle is running, the length of the propeller shaft 20 in the axial direction changes, and thus it is suppressed that a suspension such as, for example, an independent suspension type suspension, etc., moves in a front-rear direction of the vehicle 10.

Figure 3:
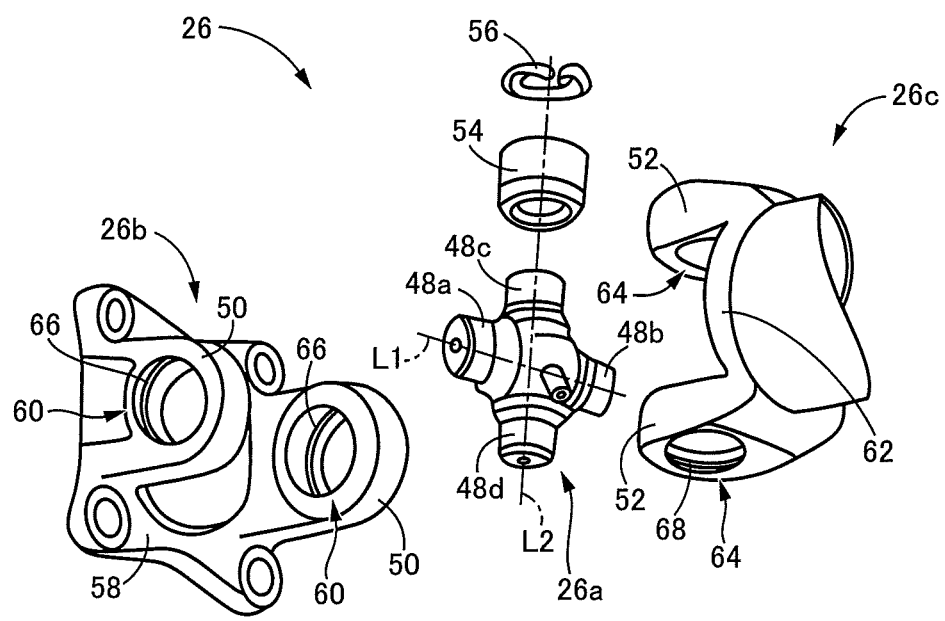
FIG. 3 is an exploded view of a first cross shaft joint in FIG. 2.

Next, a structure of the first cross shaft joint 26 is described. FIG. 3 is an exploded view of the first cross shaft joint 26. The first cross shaft joint 26 includes a cross shaft 26a formed into a cross shape and having four shaft portions 48a to 48d (referred to as shaft portion(s) 48 when not distinguished), and a forked first yoke 26b having a pair of holding portions 50 facing each other, a forked second yoke 26c having a pair of holding portions 52 facing each other, four cups 54 to be fitted so as to cover shaft ends of the respective shaft portions 48 of the cross shaft 26a, and four snap rings 56 to be respectively fitted to the first yoke 26b and the second yoke 26c in order to prevent the respective cups 54 in an assembled state from coming off the shaft portions 48. In FIG. 2, one cup 54 and one snap ring 56 to be fitted to the shaft portion 48c are described, and other three cups 54 and three snap rings 56 are omitted.

The cross shaft 26a is formed into a cross shape, and configured to have the four shaft portions 48a to 48d each formed around corresponding one of a first axis L1 and a second axis L2 orthogonal to each other on one plane passing through the axes L1 and L2 and the four shaft portions 48a to 48d are disposed radially about a crossing of the axes L1 and L2. The shaft portions 48a and 48b are formed around the first axis L1, and the shaft portions 48c and 48d are formed around the second axis L2. Shaft diameters (outer diameters) and shaft lengths of the respective shaft portions 48a to 48d are set to the same dimension. The structure of the cross shaft 26a is described later.

The first yoke 26b is a forked member consisting of a base portion 58 and the pair of holding portions 50 extending perpendicularly from the base portion 58. The pair of holding portions 50 are formed so as to face each other at a predetermined interval. In each of the pair of holding portions 50, a shaft hole 60 into which the shaft portion 48a, 48b of the cross shaft 26a is inserted when the first yoke 26b is assembled in the cross shaft 26a is formed. The pair of shaft holes 60 are formed around the same axis, and the inner diameter of the respective shaft holes 60 is formed to be larger than the outer diameter of the shaft portions 48. Specifically, the inner diameter of the respective shaft holes 60 is set to the size that allows the shaft portions 48 to be fitted into the shaft holes 60 when the first yoke 26b is assembled in the cross shaft 26a. The first yoke 26b rotatably supports the pair of shaft portions 48a and 48b formed on the first axis L1 via the cups 54 after assembly of the first yoke 26b on the cross shaft 26a.

The second yoke 26c is a forked member consisting of a base portion 62 and the pair of holding portions 52 extending perpendicularly from the base portion 62. The holding portions 52 are formed so as to face each other at a predetermined interval. In each of the pair of holding portions 52, a shaft hole 64 into which the shaft portion 48c, 48d of the cross shaft 26a is inserted when the second yoke 26c is assembled in the cross shaft 26a are formed. The pair of shaft holes 64 are formed around the same axis, and the inner diameter of the respective shaft holes 64 is formed to be larger than the outer diameter of the shaft portions 48. Specifically, the inner diameter of the respective shaft holes 64 is set to the size that allows the shaft portions 48 to be fitted into the shaft holes 64 when assembled. The second yoke 26c rotatably supports the pair of shaft portions 48c and 48d formed on the second axis L2 via the cups 54 after assembly of the second yoke 26c on the cross shaft 26a.

The cup 54 is formed into a bottomed cylindrical shape, and is fitted into a shaft end of the each shaft portion 48 so as to cover the shaft end of the shaft portion 48. Specifically, at the time of assembly of the cup 54 on the shaft portion 48, in a state where the respective shaft portions 48 of the cross shaft 26a are fitted in the shaft holes 60 of the first yoke 26b and the shaft holes 64 of the second yoke 26c, the respective cups 54 are fitted to the shaft ends of the respective shaft portions 48. Inside each of the cups 54, a roller bearing is provided, and the respective cups 54 are fitted to the respective shaft portions 48 in a state where the cups 54 are relatively rotatable with respect to the respective shaft portions 48 via the roller bearings. An outer diameters of the cups 54 are set to the dimensions with which outer circumferential surfaces of the cups 54 and inner circumferential surfaces of the shaft holes 60 and 64 fit in a slidable state. Therefore, positions of the respective shaft portions 48 of the cross shaft 26a with respect to the first yoke 26b and the second yoke 26c are determined after assembly of the cup 54 on the shaft portion 48 using the cups 54.

The snap rings 56 are fitted to annular grooves 66 formed on the inner circumferential surfaces of the shaft holes 60 of the first yoke 26b in a state where the cups 54 are fitted in the shaft holes 60 of the first yoke 26b. When the snap rings 56 are fitted to the grooves 66, the cups 54 are prevented from coming off the shaft portions 48a and 48b by end portions of the cups 54 contacting the snap rings 56. Also, the snap rings 56 are fitted in annular grooves 68 formed on the inner circumferential surfaces of the shaft holes 64 of the second yoke 26c in a state where the cups 54 are fitted in the shaft holes 64 of the second yoke 26c. When the snap rings 56 are fitted to the grooves 68, the cups 54 are prevented from coming off the shaft portions 48c and 48d by end portions of the cups 54 contacting the snap rings 56.

In a state where the first cross shaft joint 26 is assembled, the shaft portion 48a and the shaft portion 48b are held rotatably by the pair of holding portions 50 of the first yoke 26b. The holding portions 50 and the shaft portions 48a and 48b become rotatable relative to each other by interposing, between the holding portions 50 and the shaft portions 48a and 48b, the cups 54 having roller bearings. In addition, the shaft portion 48c and the shaft portion 48d are held rotatably by the pair of holding portions 52 of the second yoke 26c. The holding portions 52 and the shaft portions 48c and 48d become rotatable relative to each other by interposing, between the holding portions 52 and the shaft portions 48c and 48d, the cups 54 having roller bearings. By the configuration described above, transmission of rotation is enabled while allowing a change in an axis crossing angle between the output shaft 18a coupled to the first yoke 26b and the first hollow shaft 30 coupled to the second yoke 26c.

Figure 4:
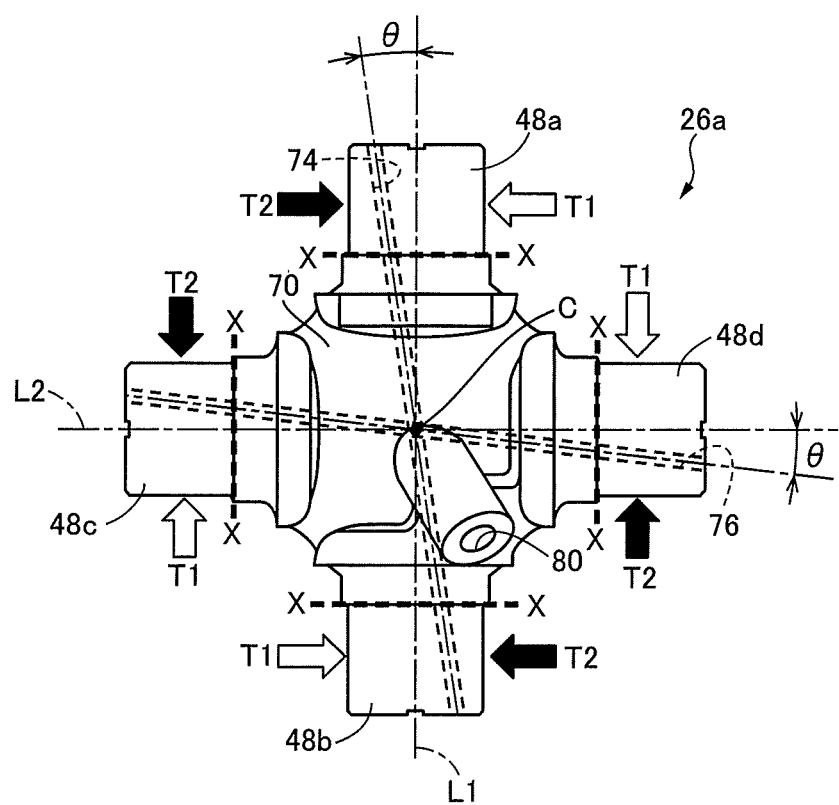
FIG. 4 is a view of a cross shaft of the first cross shaft joint in FIG. 2, viewed from the arrow A direction.

Next, a structure of the cross shaft 26a is described. FIG. 4 is a view of the cross shaft 26a of the first cross shaft joint 26 in FIG. 2, viewed from an arrow A direction shown in FIG. 2. The cross shaft 26a is a cross-shaped member including a base portion 70 and the four shaft portions 48a to 48d radially extending from the base portion 70 (referred to as shaft portion(s) 48 when not particularly distinguished).

The base portion 70 has a thickness approximately equal to a shaft diameter (diameter) of the shaft portion 48, and is formed into a substantially square shape. The base portion 70 rotates around an intersection C between the first axis L1 and the second axis L2 orthogonal to each other on one plane passing through the first axis L1 and the second axis L2.

Each of the four shaft portions 48a to 48d is formed around respective one of the first axis L1 and the second axis L2 orthogonal to each other on the one plane, and extends radially around the intersection C (refer to FIG. 4) between the first axis L1 and the second axis L2. The shaft portion 48a and the shaft portion 48b are formed at positions that are on the first axis L1 and opposite each other with respect to the intersection C. That is, the shaft portion 48a and the shaft portion 48b are formed symmetrically about the second axis L2. The shaft portion 48c and the shaft portion 48d are formed at positions that are on the second axis L2 and opposite each other with respect to the intersection C. That is, the shaft portion 48c and the shaft portion 48d are formed symmetrically about the first axis L1. The shaft diameters (diameters) of the shaft portions 48a to 48d are set to the same dimension.

Inside the cross shaft 26a, a first lubrication hole 74 and a second lubrication hole 76 to be filled with a lubricant are formed. The first lubrication hole 74 is a through hole having a circular section which passes through the inside of the shaft portion 48a, the base portion 70, and the shaft portion 48b. The first lubrication hole 74 passes through the intersection C between the first axis L1 and the second axis L2, and is in communication with the shaft end of the shaft portion 48a and the shaft end of the shaft portion 48b. As shown in FIG. 4, the first lubrication hole 74 is formed so as to incline at a predetermined angle θ counterclockwise around the intersection C with respect to the first axis L1. The first lubrication hole 74 and the second lubrication hole 76 correspond to the lubrication hole of the present invention.

The second lubrication hole 76 is a through hole having a circular section which passes through the inside of the shaft portion 48c, the base portion 70, and the shaft portion 48d. The second lubrication hole 76 passes through the intersection C between the first axis L1 and the second axis L2, and is in communication with the shaft end of the shaft portion 48c and the shaft end of the shaft portion 48d. The second lubrication hole 76 is formed so as to incline at the predetermined angle θ clockwise around the intersection C with respect to the second axis L2, as shown in FIG. 4.

The first lubrication hole 74 and the second lubrication hole 76 (referred to as lubrication holes 74 and 76 when not distinguished) are respectively in communication with a lubricant filling hole 80 shown in FIG. 4, and a lubricant is filled in the first lubrication hole 74 and the second lubrication hole 76 from the lubricant filling hole 80 in a state where the cups 54 and the snap rings 56 are installed at the time of assembly. Accordingly, a lubricant is supplied to the roller bearings provided inside the cups 54 through the lubrication holes 74 and 76, lubricity of the roller bearings is therefore secured, and the lives of the roller bearings are also secured.

In FIG. 4, each of white arrows shows a position of the shaft portion 48 to which a drive torque T1 is transmitted from the engine 12 side when the vehicle 10 travels forward. When the vehicle 10 travels forward, the drive torque T1 is transmitted through the positions of the tip end of the white arrows in the shaft portion 48. On the other hand, each of black arrows shows a position of the shaft portion 48 to which a driven torque T2 is transmitted from the drive wheel 24 side when the vehicle 10 decelerates. When the vehicle 10 decelerates, the driven torque T2 is transmitted through the positions of the tip end of the black arrows in the shaft portion 48. A maximum value T1max (absolute value) of the drive torque T1 input to the shaft portion 48 from the engine 12 side when the vehicle 10 travels forward is sufficiently larger than a maximum value T2max (absolute value) of the driven torque T2 input to the shaft portion 48 from the drive wheel 24 side when the vehicle 10 decelerates (T1max<T2max).

As shown in FIG. 4, the first lubrication hole 74 is formed such that the first lubrication hole 74 is more distant, than the first axis L1, from the positions in the shaft portions 48a and 48b to which the drive torque T1 is transmitted from the first yoke 26b. The first lubrication hole 74 is formed so as to incline at the predetermined angle θ in a rotation direction around the intersection C with respect to the first axis L1, and the inclination direction of the first lubrication hole 74 is set in a direction away from the positions in the shaft portions 48 at which the drive torque T1 is transmitted.

As shown in FIG. 4, the second lubrication hole 76 is formed such that the second lubrication hole 76 is more distant, than the second axis L2, from the positions in the shaft portions 48c and 48d at which the drive torque T1 is transmitted to the second yoke 26c. The second lubrication hole 76 is formed so as to incline at the predetermined angle θ in a rotation direction around the intersection C with respect to the second axis L2, and the inclination direction of the second lubrication hole 76 is set in a direction away from the positions at which the drive torque T1 is transmitted.

While the vehicle 10 is running, a bending stress becomes maximum at planes (hereinafter referred to as maximum bending stress generating plane(s)) overlapping dashed lines X in FIG. 4 corresponding to roots of the shaft portions 48. As to a section modulus Z on this maximum bending stress generating plane, when a section modulus Z in a case where the drive torque T1 is input is defined as a section modulus Z1, and a section modulus Z in a case where the driven torque T2 is input is defined as a section modulus Z2, the section modulus Z1 becomes larger than the section modulus Z2 (Z1>Z2) due to the fact that the lubrication holes 74 and 76 are formed at positions more distant, than the axes L1 and L2, from the positions in the shaft portions 48 at which the drive torque T1 is transmitted. In addition, in a case where a section modulus Z when the lubrication holes 74, 76 are formed on the axes L1 and L2 without inclining with respect to the axes L1 and L2 (hereinafter referred to as inclination absence) is defined as a section modulus Z3, the section modulus Z3 becomes larger than the section modulus Z2, and the section modulus Z1 becomes larger than the section modulus Z3 (Z1>Z3>Z2).

A bending stress σ that is generated on the maximum bending stress generating plane is inversely proportional to the section modulus Z, therefore, as the section modulus Z becomes larger, the bending stress σ becomes smaller. Here, a bending stress σ when the drive torque T1 is transmitted is defined as σ1 (=T1/Z1), and a bending stress σ when the driven torque T2 is transmitted is defined as σ2 (=T2/Z2). In addition, in case of the inclination absence, a bending stress σ when the drive torque T1 is transmitted is defined as σ31 (T1/Z3), and a bending stress σ when the driven torque T2 is transmitted is defined as σ32 (T2/Z3). In this case, the section modulus Z1 is larger than the section modulus Z3, therefore, when the drive torque T1 is input, the bending stress σ1 becomes smaller than the bending stress σ31 in case of the inclination absence (σ1<σ31).

From the description above, in a case where the drive torque T1 is transmitted from the first yoke 26b to the shaft portions 48, due to the fact that the lubrication holes 74 and 76 are formed at positions more distant, than the axes L1 and L2, from the positions in the shaft portions 48 to which the drive torque T1 is input, the bending stress σ1 becomes smaller than the bending stress σ31 in case of the inclination absence. That is, portions that are relatively decreased in rigidity by forming the lubrication holes 74 and 76 in the shaft portions 48 are moved away from the positions to which the drive torque T1 from the engine 12 side is transmitted, and accordingly, the section modulus Z1 when the drive torque T1 is transmitted becomes larger than the section modulus Z3 in case of the inclination absence, and the bending stress σ1 when the drive torque T1 is transmitted is reduced as compared to the bending stress σ31 in case of the inclination absence. As a result, the strength of the cross shaft 26a against the drive torque T1 input from the engine 12 side is increased. The predetermined value θ is obtained experimentally or in design in advance, and is set at a value such that the bending stress σ1 (maximum value) when a maximum value T1max of the drive torque T1 is input to the shaft portions 48 becomes not more than a permissible value regulated in design.

On the other hand, due to the fact that the section modulus Z3 in case of the inclination absence is larger than the section modulus Z2 when the driven torque T2 is transmitted, in a case where the driven torque T2 is transmitted from the second yoke 26c to the shaft portions 48, the bending stress σ2 becomes larger than the bending stress σ32 in case of the inclination absence (σ2>σ32). Here, the maximum value T1max of the drive torque T1 is sufficiently larger than the maximum value T2max of the driven torque T2, therefore, a maximum value σ1max of a bending stress σ1 in a case where the maximum value T1max of the drive torque T1 is transmitted becomes larger than a maximum value σ2max of a bending stress σ2 in a case where the maximum value T2max of the driven torque T2 is transmitted (σ1max>σ2max). That is, in a case where the maximum value T1max of the drive torque T1 is transmitted, the bending stress σ1 generated in the cross shaft 26a reaches a maximum value σ1max. Therefore, the maximum value σ1max of the bending stress σ1 generated in a case where the maximum value T1max of the drive torque T1 is transmitted is reduced by forming the lubrication holes 74 and 76, the strength of the cross shaft 26a when the drive torque T1 is transmitted from the engine 12 side can therefore be secured. In connection thereto, it can also be avoided that the size of the cross shaft 26a is increased in order to secure the strength of the cross shaft 26a. Due to the fact that the maximum value T2max of the driven torque T2 transmitted at the time of deceleration of the vehicle 10 is sufficiently smaller as compared to the maximum value T1max of the drive torque T1 transmitted at the time of acceleration (forward running) of the vehicle 10, even when the section modulus Z2 becomes smaller, the bending stress σ2 does not exceed the maximum value σ1max of the bending stress σ1 in a case where the drive torque T1 is transmitted. Therefore, also in a case where the driven torque T2 is transmitted, the strength of the cross shaft 26a is secured.

Also, in the second cross shaft joint 28 as well, a first lubrication hole and a second lubrication hole formed inside the cross shaft 28a are formed such that the first and second lubrication holes are more distant, than respective axes, from positions in shaft portions to which the drive torque T1 is transmitted. Therefore, for the second cross shaft joint 28 as well, the same operation and effect as in the first cross shaft joint 26 are obtained. Shapes of the first lubrication hole and the second lubrication hole formed in the cross shaft 28a of the second cross shaft joint 28 are basically the same as those of the first lubrication hole 74 and the second lubrication hole 76 formed in the cross shaft 26a described above, and detailed description thereof is omitted. When the cross shaft 28a is viewed from an arrow B direction in FIG. 2, the positions of the first lubrication hole and the second lubrication hole formed in the cross shaft 28a are the same as the positions of the first lubrication hole 74 and the second lubrication hole 76 when the cross shaft 26a in FIG. 4, which is the cross shaft 26a when viewed from the arrow A direction in FIG. 2, is rotated 90 degrees around the intersection C.

As described above, according to the present example, the lubrication holes 74 and 76 to be formed in the shaft portions 48 are respectively formed at positions more distant, than the axes L1 and L2, from the positions in the shaft portions 48 to which the drive torque T1 is input from the engine 12 side, therefore, the portions that are relatively decreased in rigidity by formation of the lubrication holes 74 and 76 in the shaft portions 48 can be moved away from the positions to which the drive torque T1 is input from the engine 12 side, and the strength of the cross shaft 26a against the drive torque T1 input from the engine 12 side can be increased.

Also, according to the present example, the lubrication holes 74 and 76 are formed so as to incline at the predetermined angle θ around the intersection C between the two axes L1 and L2 with respect to the axes L1 and L2, therefore, the lubrication holes 74 and 76 can be moved away from the positions in the shaft portions 48 to which the drive torque T1 is input from the engine 12 side.

Next, another example of the present invention is described. In the following description, portions in common to the above-described example are provided with the same reference signs, and description thereof is omitted.

EXAMPLE 2

Figure 5:
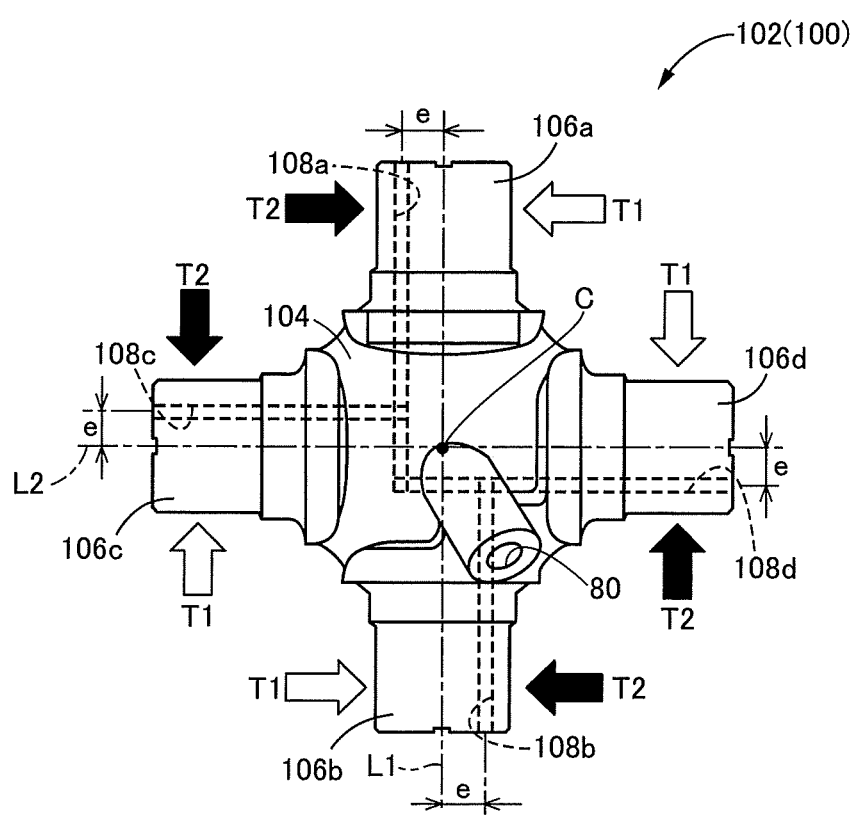
FIG. 5 is a view showing a structure of a cross shaft constituting a cross shaft joint which is another example of the present invention.

FIG. 5 is a view showing a structure of a cross shaft 102 constituting a cross shaft joint 100 which is another example of the present invention, and corresponds to FIG. 4 of the above-described example. The cross shaft joint 100 is provided at a shaft end portion of the propeller shaft 20 as in the above-described example. The first yoke 26b, the second yoke 26c, the cups 54, and the snap rings 56 constituting the cross shaft joint 100 are the same as in the above-described example, and descriptions thereof are omitted. The cross shaft joint 100 corresponds to the cross shaft joint of a vehicle of the present invention.

The cross shaft 102 is a cross-shaped member including a base portion 104, and four shaft portions 106a to 106d (referred to as shaft portion(s) 106 when not particularly distinguished) extending radially from the base portion 104.

The base portion 104 has a predetermined thickness, and is formed into a substantially square shape. The base portion 104 rotates around an intersection C between a first axis L1 and a second axis L2 orthogonal to each other on one plane passing through the first axis L1 and the second axis L2.

The four shaft portions 106 are disposed on the first axis L1 and the second axis L2 orthogonal to each other on the one plane and the four shaft portions 106 extend radially. Specifically, the shaft portion 106a and the shaft portion 106b are on the first axis L1, and are formed symmetrically about the second axis L2. The shaft portion 106c and the shaft portion 106d are on the second axis L2, and are formed symmetrically about the first axis L1. Shaft diameters (diameters) of the shaft portions 106a to 106d are set to the same dimension.

Inside the cross shaft 102, a first lubrication hole 108a, a second lubrication hole 108b, a third lubrication hole 108c, and a fourth lubrication hole 108d to be filled with a lubricant in advance are formed. The first lubrication hole 108a to the fourth lubrication hole 108d correspond to the lubrication hole of the present invention.

The first lubrication hole 108a has a circular section, and is formed inside the shaft portion 106a and the base portion 104. The first lubrication hole 108a is formed parallel to the first axis L1, and one end of the first lubrication hole 108a in the first axis L1 direction is in communication with a shaft end of the shaft portion 106a. The first lubrication hole 108a is formed at a position eccentric by a predetermined value e with respect to the first axis L1. Specifically, the first lubrication hole 108a is formed to be eccentric by the predetermined value e from the first axis L1 to a side moving away from a position in the shaft portion 106a shown by a white arrow at which the drive torque T1 is transmitted.

The second lubrication hole 108b has a circular section, and is formed inside the shaft portion 106b and the base portion 104. The second lubrication hole 108b is formed parallel to the first axis L1, and one end of the second lubrication hole 108b in the first axis L1 direction is in communication with a shaft end of the shaft portion 106b. The second lubrication hole 108b is formed at a position eccentric by the predetermined value e with respect to the first axis L1. Specifically, the second lubrication hole 108b is formed to be eccentric by the predetermined value e from the first axis L1 to a side moving away from a position in the shaft portion 106b shown by a white arrow at which the drive torque T1 is transmitted.

The third lubrication hole 108c has a circular section, and is formed inside the shaft portion 106c and the base portion 104. The third lubrication hole 108c is formed parallel to the second axis L2, and one end of the third lubrication hole 108c in the second axis L2 direction is in communication with a shaft end of the shaft portion 106c. The third lubrication hole 108c is formed at a position eccentric by the predetermined value e with respect to the second axis L2. Specifically, the third lubrication hole 108c is formed to be eccentric by the predetermined value e from the second axis L2 to a side moving away from a position in the shaft portion 106c shown by a white arrow at which the drive torque T1 is transmitted.

The fourth lubrication hole 108d has a circular section, and is formed inside the shaft portion 106d and the base portion 104. The fourth lubrication hole 108d is formed parallel to the second axis L2, and one end of the fourth lubrication hole 108d in the second axis L2 direction is in communication with a shaft end of the shaft portion 106d. The fourth lubrication hole 108d is formed at a position eccentric by the predetermined value e with respect to the second axis L2. Specifically, the fourth lubrication hole 108d is formed to be eccentric by the predetermined value e from the second axis L2 to a side moving away from a position in the shaft portion 106d shown by a white arrow at which the drive torque T1 is transmitted.

As shown in FIG. 5, an end portion of the first lubrication hole 108a on the base portion 104 side in the first axis L1 direction is connected to the end portion of the fourth lubrication hole 108d on the base portion 104 side in the second axis L2 direction. In addition, an end portion of the third lubrication hole 108c on the base portion 104 side in the second axis L2 direction is connected to the first lubrication hole 108a, and an end portion of the second lubrication hole 108b on the base portion 104 side in the first axis L1 direction is connected to the fourth lubrication hole 108d.

Therefore, as shown in FIG. 5, the first lubrication hole 108a to the fourth lubrication hole 108d are in communication with each other inside the cross shaft 102.

The lubricant filling hole 80 is in communication with these first lubrication hole 108a to the fourth lubrication hole 108d, and at the time of assembly, by filling a lubricant from the lubricant filling hole 80, the lubricant is supplied to the first lubrication hole 108a to the fourth lubrication hole 108d, and further, the lubricant is supplied to the roller bearings provided inside the cups 54 through the first lubrication hole 108a to the fourth lubrication hole 108d. Accordingly, lubricity of the roller bearings is secured, and the lives of the roller bearings are also secured.

In the cross shaft 102 configured as described above as well, the first lubrication hole 108a to the fourth lubrication hole 108d are formed to be eccentric and more distant, than the axes L1 and L2, by the predetermined value e from positions at which the drive torque T1 is transmitted, therefore, the section modulus Z1 in a case where the drive torque T1 is transmitted becomes larger as compared to the section modulus Z3 in a case where the lubrication holes are formed on the axes L1 and L2 without becoming eccentric with respect to the axes L1 and L2 (hereinafter referred to as eccentricity absence) (Z1>Z3). Therefore, a bending stress σ1 when the drive torque T1 is transmitted is reduced as compared to a bending stress σ31 at the time of eccentricity absence (σ1<σ31), and therefore, the strength of the cross shaft 102 when the drive torque T1 is transmitted can be improved. The predetermined value e is obtained experimentally or in design in advance, and is set at a value such that a bending stress al generated when the maximum value T1max of the drive torque T1 is transmitted to the shaft portions 106 becomes not more than a permissible value regulated in design.

As described above, according to the present example as well, the first to fourth lubrication holes 108a to 108d are formed parallel to the axes L1 and L2 at positions eccentric by the predetermined value e with respect to the axes L1 and L2 of the shaft portions 106, and the first to fourth lubrication holes 108a to 108d are moved away from the positions in the shaft portions 106 at which the drive torque T1 of the engine 12 is transmitted, the same effect as in the above-described example can therefore be obtained.

While examples of the present invention have been described in detail above based on the drawings, the present invention is also applied to other modes.

For example, in the above-described examples, the first cross shaft joint 26 and the second cross shaft joint 28 are provided at both ends of the propeller shaft 20 interposed between the automatic transmission 18 and the differential gear mechanism 22, however, the present invention is not necessarily limited thereto. For example, in a four-wheel-drive vehicle, the present invention can also be applied to cross shaft joints to be provided at both ends of a front propeller shaft interposed between a transfer and a front differential mechanism. Also, the present invention is not limited to the hybrid vehicle 10, but can be applied to a vehicle including, for example, a manual transmission, a stepped automatic transmission, or a belt-type continuously variable transmission, etc., as long as it is configured to include a cross shaft joint to be connected to a propeller shaft.

In the above-described example, the first lubrication hole 74 and the second lubrication hole 76 are respectively formed so as to incline around the intersection C between the first axis L1 and the second axis L2 with respect to the axes L1 and L2, however, the lubrication holes do not necessarily have to incline around the intersection C, and may be formed to incline at positions eccentric with respect to the intersection C. In the example described above, the first lubrication hole 74 and the second lubrication hole 76 respectively incline at the predetermined angle θ with respect to the axes L1 and L2, however, the predetermined angle θ may differ between the first lubrication hole 74 and the second lubrication hole 76, respectively.

In Example 2 described above, the first lubrication hole 108a to the fourth lubrication hole 108d are respectively formed parallel to the axes L1 and L2, however, they do not necessarily have to be formed parallel to the axes L1 and L2, and may be formed to incline with respect to the axes L1 and L2. All of the first lubrication hole 108a to the fourth lubrication hole 108d are eccentric by the predetermined value e with respect to the axes L1 and L2, however, the predetermined value e may differ among the first lubrication hole 108a to the fourth lubrication hole 108d, respectively.

In the above-described example, in the first cross shaft joint 26 and the second cross shaft joint 28 to be provided at both ends of the propeller shaft 20, the lubrication holes are formed so as to move away from positions in the shaft portions to which the drive torque T1 is input, however, the present invention may be applied to one of the first cross shaft joint 26 and the second cross shaft joint 28.

The above description is just an embodiment, and the present invention can be carried out in modes variously changed or improved based on knowledge of a person skilled in the art.

REFERENCE SIGNS LIST

12: engine (drive power source)
14: motor generator (drive power source)
24: drive wheel
26: first cross shaft joint (cross shaft joint)
26a: cross shaft
26b: first yoke
26c: second yoke
28: second cross shaft joint (cross shaft joint)
28a: cross joint
28b: first yoke
28c: second yoke
48a to 48d, 106a to 106d: shaft portion
74: first lubrication hole (lubrication hole)
76: second lubrication hole (lubrication hole)
100: cross shaft joint
102: cross shaft
108a to 108d: first to fourth lubrication holes (lubrication hole)
L1: first axis (axis)
L2: second axis (axis)

What is claimed is:

1. A cross shaft joint of a vehicle, comprising:
   a cross shaft provided on a power transmission path between a drive power source and a drive wheel, and including four shaft portions formed on a first axis and a second axis orthogonal to each other on one plane and extending radially around an intersection between the two first and second axes;
   a first yoke rotatably supporting a first pair of the four shaft portions formed on the first axis of the cross shaft; and
   a second yoke rotatably supporting a second pair of the four shaft portions formed on the second axis of the cross shaft,
   wherein the cross shaft includes
      a first lubrication hole passing through an inside of each of the first pair of the four shaft portions, which is in communication with shaft ends of the first pair of the four shaft portions, and the which is configured to be filled with a lubricant, and
      a second lubrication hole passing through an side of each of the second pair of the four shaft portions, Which is in communication with shaft ends of the second pair of the four shaft portions, and which is configured to be filled with the lubricant,
   wherein a center of the first lubrication hole is more distant, than the first axis, from a position in the each of the first pair of the four shaft portions configured to receive a torque from the drive power source transmitted through the first yoke, and
   wherein a center of the second lubrication hole is more distant than the second axis, from a position in the each of the second pair of the four shaft portions configured to receive the torque from the drive power source transmitted through the second yoke.

2. The cross shaft joint of a vehicle according to claim 1, wherein the first lubrication hole is formed to incline at a predetermined angle around the intersection between the first and second axes with respect to the first axis, and
   wherein the second lubrication hole is formed to include at predetermined angle around the intersection between the first and second axes with respect to the second axis.

3. The cross shaft joint of a vehicle according to claim 2, wherein the cross shaft further comprises a lubricant filling hole in communication with the first lubrication hole and the second lubrication hole.

4. The cross shaft joint of a vehicle according to claim 1, wherein the first lubrication hole is formed parallel to the first axis, and formed at a position eccentric by a predetermined value with respect to the first axis, and
   wherein the second lubrication hole is formed parallel to the second axis, and formed at a position eccentric by a predetermined value with respect to the second axis.

5. The cross shaft joint of a vehicle according to claim 4, wherein the cross shaft further comprises a lubricant filling hole in communication with the first lubrication hole and the second lubrication hole.

6. The cross shaft joint of a vehicle according to claim 1, wherein the cross shaft further comprises a lubricant filling hole in communication with the first lubrication hole and the second lubrication hole.

* * * * *